(12) United States Patent
Buescher

(10) Patent No.: US 6,176,715 B1
(45) Date of Patent: Jan. 23, 2001

(54) ELECTRICAL CONNECTION

(75) Inventor: Hans-Joachim Buescher, Dusseldorf (DE)

(73) Assignee: Delphi Technologies, Inc., Troy, MI (US)

(*) Notice: Under 35 U.S.C. 154(b), the term of this patent shall be extended for 0 days.

(21) Appl. No.: 09/385,239

(22) Filed: Aug. 28, 1999

(30) Foreign Application Priority Data

Aug. 28, 1998 (DE) .............................................. 198 39 258

(51) Int. Cl.[7] ...................................................... H01R 3/00
(52) U.S. Cl. ............................................................ 439/162
(58) Field of Search ............................... 439/162, 32, 33, 439/165, 164; 49/28, 27, 26; 174/69; 296/155

(56) References Cited

U.S. PATENT DOCUMENTS

Re. 36,428 * 12/1999 Moore ................................. 296/155
5,877,936 * 3/1999 Nishitani ............................... 361/600
6,036,259 3/2000 Hertel et al. ....................... 296/216.1

FOREIGN PATENT DOCUMENTS

4333807A1 4/1995 (DE) .
0282389 9/1988 (EP) .

* cited by examiner

Primary Examiner—Renee Luebke
Assistant Examiner—Phuongchi Nguyen
(74) Attorney, Agent, or Firm—Patrick H. Griffin

(57) ABSTRACT

An electrical connection for the tie-up of a motor vehicle sliding door to a frame-fixed cabling (44) has an elastic and insulated conductor (10) which is arranged in a vehicle guide (12) which is fixed to the vehicle body and into which a follower (16) of the sliding door engages at which one end of the conductor (10) which is connectable to the door-side cabling (46) is fastened.

7 Claims, 3 Drawing Sheets

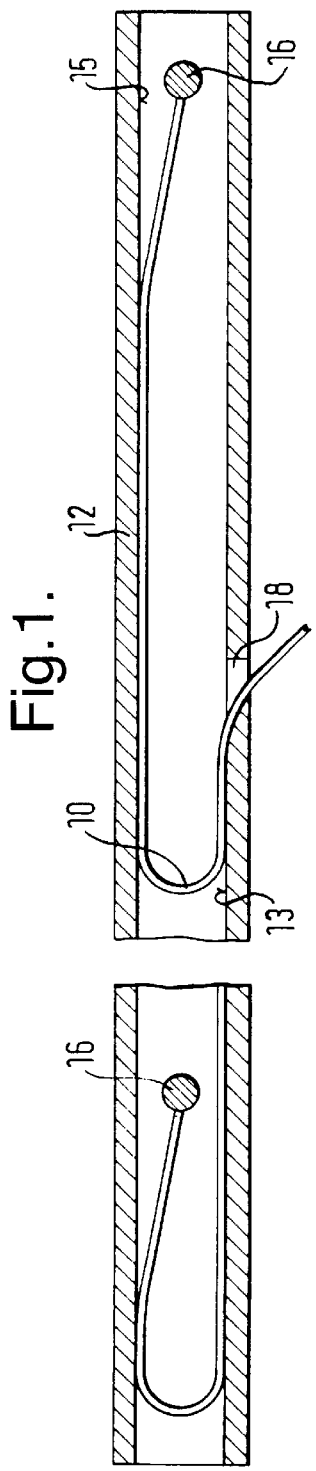
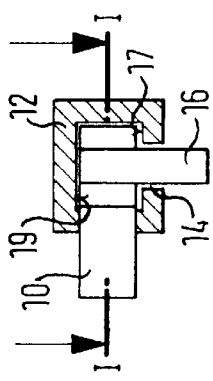
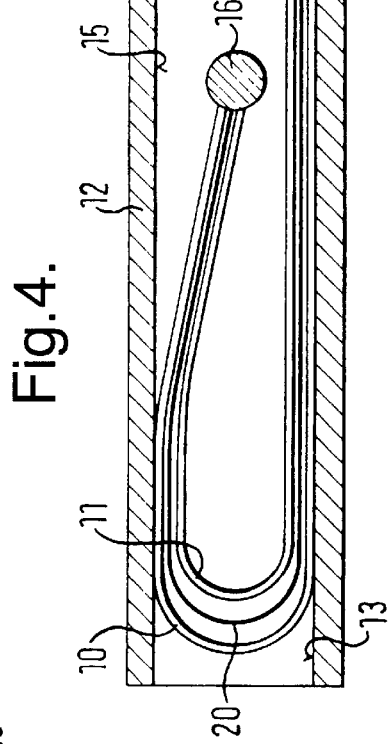
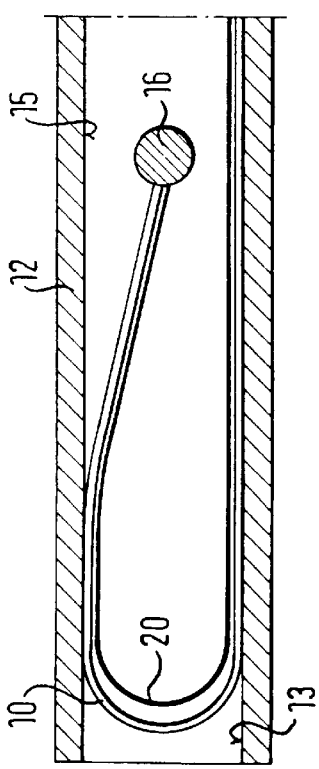

ELECTRICAL CONNECTION

TECHNICAL FIELD

The present invention relates to an arrangement for an electrical connection for the tie-up of a motor vehicle sliding door to a frame-fixed cabling and in particular for the permanent electrical tie-up of the sliding door to the electrical system of the motor vehicle.

BACKGROUND OF THE INVENTION

As a result of increased comfort requirements on motor vehicle sliding doors (electric central locking with theft securing function, electric child securing function, electric window winders, electric door closing aids, electric door lock opener drive and a tying in of the electric door systems into a BUS information system) a permanent electric tie-up of the motor vehicle sliding door to the electric system of the motor vehicle is necessary.

A tie-up of this kind is known in principle in the form of resilient door contacts, but the contact surfaces which are in contact with one another here can however easily become contaminated, through which system disturbances are caused, which are undesirable. Furthermore, the spring force and the number of door contacts which come into engagement on the last travelling path of the sliding door makes the closing of the sliding door more difficult. Finally, the increasing of the closure force through resilient door contacts in a motor driven sliding door makes the sensitive detection of an occurrence of a pinch by means of an electronic motor monitoring more difficult.

SUMMARY OF THE INVENTION

The object of the present invention is to provide an electric connection for the permanent tie-up of a motor vehicle sliding door to a frame-fixed cabling, by means of which a disturbance-free electric tie-up of a motor vehicle sliding door which can be re-equipped when necessary can take place in an economical manner.

This object is satisfied by the features of claim 1 and in particular in that at least one elastic and insulated conductor is provided which is arranged in a vehicle guide which is fixed to the vehicle body, and is deflected there preferably by about 180°. A follower of the sliding door engages into the guide, with one end of the conductor being fastened to the follower and being connectable to the door-side cabling. A spring means is provided through which the conductor is at least partially pressed against the guide.

In accordance with the invention the electric tie-up of the motor vehicle sliding door to the electric system of the motor vehicle is provided by a spring-elastic cable which produces the connection between the vehicle cable tree and the sliding door cable tree and which is held in the guide by the spring means in such a manner that it can not release itself from the guide when the sliding door is actuated or while the vehicle is in motion. Through the deflection of the conductor by 180° within the guide a portion of the conductor can be moved back and forth within the guide when the sliding door is actuated, with the conductor automatically rolling up and rolling out again or folding onto itself respectively within the guide.

The solution in accordance with the invention is substantially more economical as a result of the few parts required than the known, conventional, resilient door contacts or than other known solutions with an automatic cable roll-up. Furthermore, the system in accordance with the invention can easily be installed by way of addition in a vehicle and replaced when required. Through an absolutely disturbance-free, permanent electric tie-up of the sliding door, embodiments with electric excitation and control systems or BUS systems can be technically reliably realised. Furthermore, there is also the possibility of monitoring the pinch-in region independently of the motor with corresponding sensors along the entire travelling distance of the door.

Advantageous embodiments of the invention are described in the description, in the figures and in the subordinate claims.

In accordance with a first advantageous embodiment the spring means is formed by the conductor itself and/or is integrated into the latter. Thus it is possible for example to select a material for the electric conductor which is resiliently hard so that the spring means is formed by the conductor itself. In accordance with an alternative embodiment the conductor can consist of a conventional, elastic material (for example twisted wires), with additional resilient elements being provided within the insulation which serve as spring means. Alternatively, the insulation of the conductor can also consist of a resilient material in order to press the conductor or the insulation respectively against the guide.

In accordance with a further advantageous embodiment the spring means is provided as a separate component to the insulated conductor, with the spring means in this case preferably being arranged substantially parallel to the conductor. The spring means is preferably manufactured of an electrically conducting material and connected at its one end in a conducting manner to the vehicle body and connected at its other end in a conducting manner to the sliding door. Through this there results the great advantage that the sliding door is connected at all times in a conducting manner to the vehicle body, with the spring means serving as a permanent ground connection.

A particularly advantageous embodiment results from at least two separate conductors being provided, between which the spring means is provided, which preferably consists of an electrically conducting material. In this embodiment the spring means can be used in addition as a screening between the two separate conductors.

The guide is preferably designed in such a manner that the conductor is guided at two, preferably at three sides. Through this it is ensured that the conductor is always held in the guide, and indeed both for the case of an actuation of the sliding door and for the case that the vehicle is in motion.

A constructionally particularly simple variant of the guide is given by a track-like guide which has a substantially C-shaped cross-section. In this the follower can engage into the guide through the cut-out between the limbs of the C.

In order to be able to maintain a small constructional size in the case of a large number of signals to be transmitted between the sliding door and the motor vehicle, the conductor can be designed as a multi-pole ribbon cable. In this it is also possible to use a plurality of such ribbon cables in parallel.

The spring force of the conductor or of the ribbon cable respectively should expediently be as small as is functionally possible in order that the sliding between the conductor and the guide track is possible. In this the friction between the conductor or the cable respectively and the guide can be minimised through a correspondingly friction reducing material choice in the materials of the guide and in the outer material of the conductor. A minimisation of the friction is also possible through the application of corresponding, friction reducing surfaces onto the guide and/or the ribbon cable.

BRIEF DESCRIPTION OF THE DRAWINGS

The present invention will now be described, by way of example, with reference to the accompanying drawings, in which:

FIG. 1 is a cross-sectional view through an electrical connection in accordance with the invention;

FIG. 2 is a sectional view through the connection in accordance with FIG. 1;

FIG. 3 is a view similar to FIG. 1 of a further embodiment;

FIG. 4 is a view similar to FIG. 3 of a further embodiment;

DESCRIPTION OF THE PREFERRED EMBODIMENT

Figure 5:
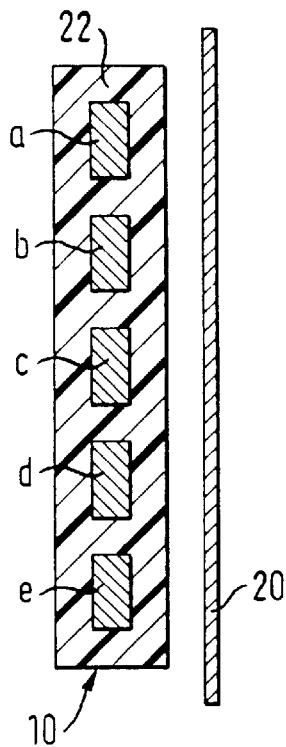
FIG. 5 is a section through the conductor and the spring element of FIG. 3.

FIG. 1 shows a sectional view through an electrical connection for the tie-up of a motor vehicle sliding door to a frame-fixed cabling, in which an elastic and insulated conductor 10 is arranged in a guide 12 which is connected to the vehicle body. By an elastic conductor is understood here any conductor or any cable respectively which follows a multiple deformation.

As shown in FIG. 2, the guide 12 is designed in the manner of a track and has a substantially C-shaped cross-section, with a reception slit 14 being formed between the limbs of the C through which a follower 16 engages into the interior of the guide 12 which is connected to the sliding door (not illustrated). When the sliding door of the motor vehicle is opened or closed, the latter moves in its guide, with the follower 16 being moved back and forth in the guide 12 at the same time.

As is further shown in FIG. 2, the conductor 10 is designed as a ribbon cable, with one end of the ribbon cable 10 being led out of the guide through a cut-out 18 in the guide 12. The end of the ribbon cable 10 which is led out is furthermore secured to the guide 12 in the region of the cut-out 18 and is connected to the electric system of the motor vehicle outside the guide 12.

The other end of the ribbon cable 10, which is located inside the guide 12, is connected there to the follower 16, with this end being connectable to the door-side cabling.

In the conductor 10 of the exemplary embodiment in accordance with FIGS. 1 and 2 the individual conductors of the ribbon cable are manufactured of a spring-elastic material so that the conductor 10 or the ribbon cable 10 respectively has spring-elastic properties. As shown in FIG. 1, the conductor 10 is laid into the interior of the guide 12 after its introduction through the cut-out 18 and is deflected by 180° inside the guide 12 so that the conductor 10 lies in contact at two oppositely disposed, parallel walls 13 and 15 of the guide 12. In this the conductor 10 is always pressed against the walls 13 and 15 by the integrated spring means, and indeed independently of which momentary position the sliding door is in.

The end position of the sliding door is illustrated on the left in FIG. 1, which means its closed position in which the follower 16 is moved by the sliding door into its left end position. Illustrated on the right in FIG. 1 is the opened position of the door in which the follower 16 is in its right end position. As can be well recognised the conductor 10 is pressed against the walls 13 and 15 of the guide 12 by the integrated spring means. The conductor 10 always automatically moves resiliently back into its original shape after a bending (for example through an opening of the door). Through the spring properties of the ribbon cable 10 the latter is always pressed against the walls 13 and 15 of the guide 12 in spite of its deflection by 180° inside the guide. In this connection it can be recognised in FIG. 2 that the height of the guide 12 is matched to the width of the ribbon cable 10 so that undercuttings are formed through the C-shaped cross-section into which the ribbon cable 10 is pressed in. Through this the ribbon cable is guided at a total of three sides, namely at its lower side by the wall 13 or 15 and at its two outer end sides by the two further inner walls 17, 19 of the guide 12.

FIGS. 3 and 4 show alternative embodiments to FIG. 1, with similar parts being provided with the same reference symbols.

In the embodiment illustrated in FIG. 3 the conductor 10 is again designed as a ribbon cable, however with a separate spring element 20 in the form of a spring steel band being provided. The spring element 20 extends substantially parallel to the conductor 10 and is fastened at its one end to the follower 16, i.e. at the sliding door, and at its other (non-illustrated) end in the region of the cut-out 18 at the guide 12. Here as well the conductor 10 is always pressed against the inner walls 13, 15 or 17, 19 respectively of the guide 12 by the action of the spring element 20. At the same time the spring means serves as a continuous ground connection between the sliding door and the vehicle body.

FIG. 4 shows an embodiment similar to FIG. 3, with however two conductors or two ribbon cables 10, 11 respectively being provided, between which the spring element 20 is arranged. In this embodiment the spring element 20 or the spring steel strip 20 respectively can serve both as a ground connection and as an electrical screening between the two conductors 10 and 11 so that power supply current on the one hand and signals on the other hand can be transmitted separately and screened off from one another.

FIG. 5 shows the cross-section through the conductor 10 and the spring element 20 of the embodiment in accordance with FIG. 3. As can be recognised, the conductor 10 is designed as a ribbon cable with a substantially rectangular cross-section, with individual conductors a to e being embedded in an insulation body 22. The individual conductors a to e likewise have a substantially rectangular cross-section and can consist of a copper band or of copper braids. The spring element 20 is designed in this embodiment as a thin band of flat steel and has a width which somewhat exceeds the width of the conductor 10.

Figure 6:
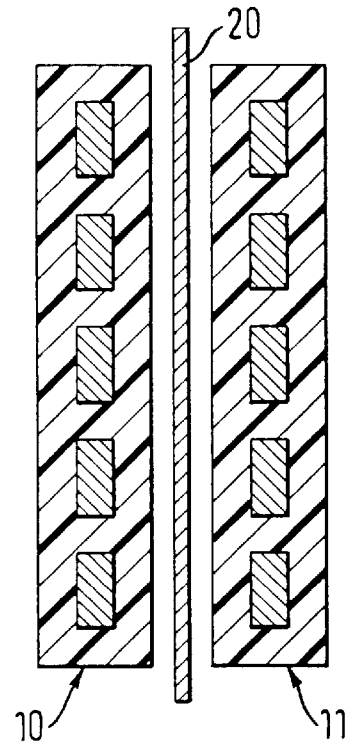
FIG. 6 is a section through the conductor and the spring element of FIG. 4.

FIG. 6 shows a cross-section through the conductors 10, 11 and the spring element 20 of the embodiment in accordance with FIG. 4. In this the construction of the conductors 10 and 11 corresponds to that of FIG. 5. As can be recognised, the spring element 20 is furthermore arranged between the two ribbon cables 10 and 11, through which the latter can be screened off from one another.

Figure 7:
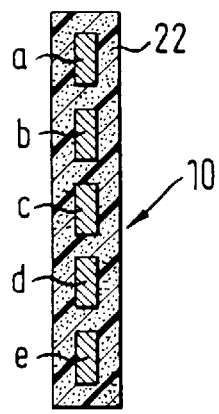
FIGS. 7 to 9 are sectional views through different embodiments of conductors.
Figure 8:
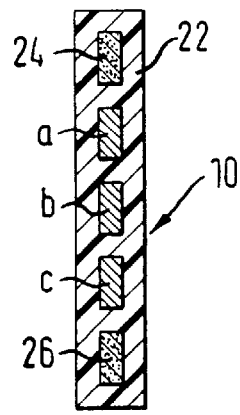
Figure 9:
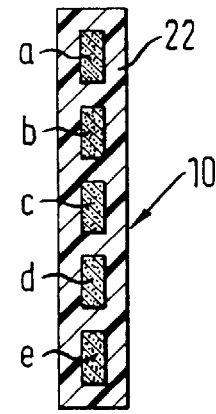

FIGS. 7 to 9 show different embodiments of conductors 10 or 11 respectively, the fundamental construction of which however is similar to that of FIGS. 5 and 6. In the embodiment illustrated in FIG. 7 the insulation body 22 consists of a resilient material, with it not being necessary for the individual conductors a to e to possess any spring-elastic properties.

In the embodiment illustrated in FIG. 8, in addition to the three centrally arranged conductors a, b and c, two outer spring elements 24 and 26 are embedded into the insulation body 22, the cross section of which corresponds to that of the conductors a to c.

Finally, FIG. 9 shows a further variant of a conductor 10 which is realised in the exemplary embodiment illustrated in FIGS. 1 and 2. In this variant the individual conductors a to e consist of a resilient material and are embedded into a conventional insulation 22.

Figure 10:
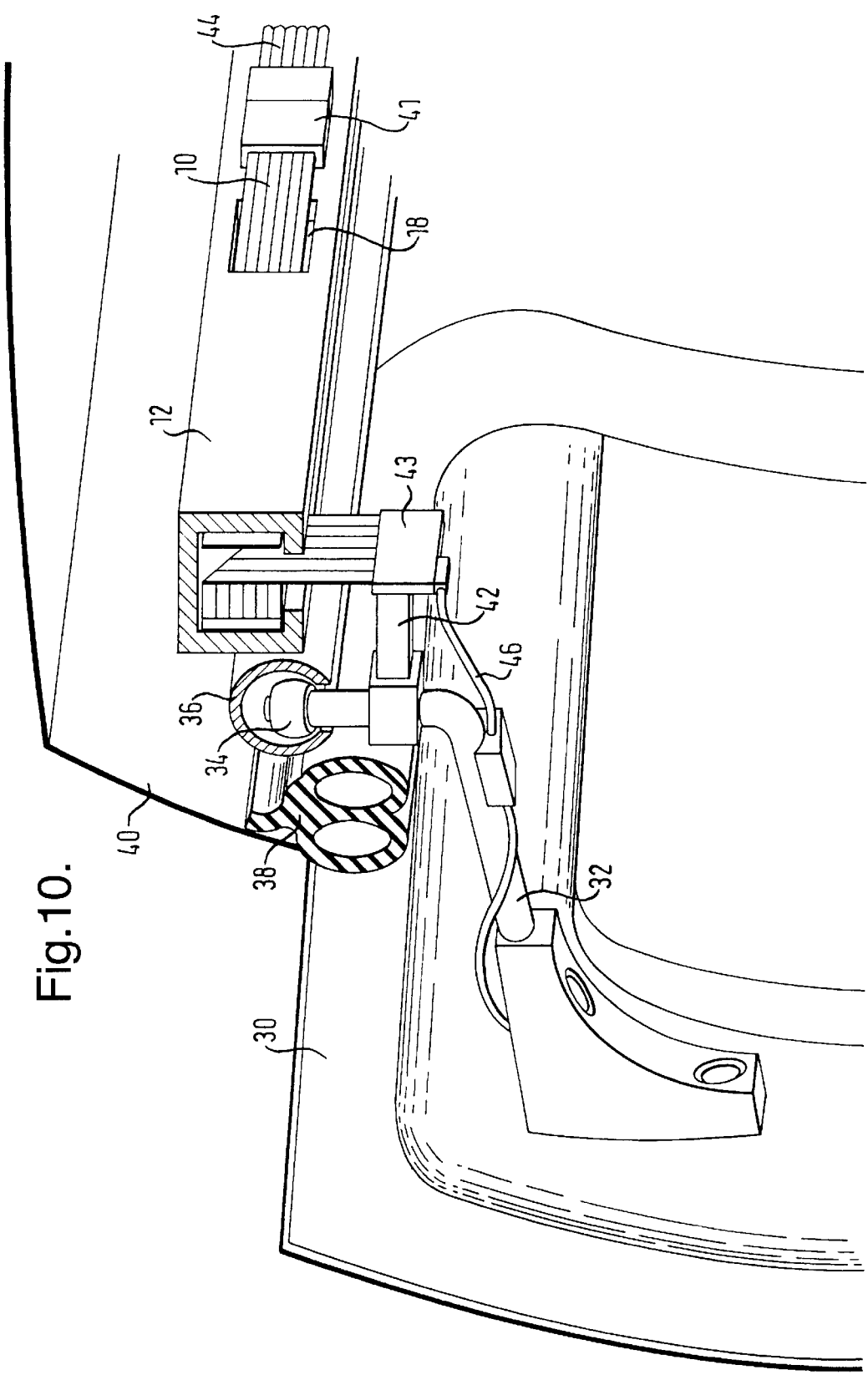
FIG. 10 is a perspective, partially sectioned inner view of an electrical connection in accordance with the invention which is installed into a motor vehicle.

FIG. 10 shows the perspective view of an electrical connection in accordance with the invention which is installed in a motor vehicle. FIG. 10 shows a sliding door 30 of a motor vehicle which is guided in a horizontal guide track 36 via a holder arm 32, at the end of which a guide roller 34 is secured. A door seal 38 serves for the sealing off between the sliding door 30 and the vehicle body 40.

Connected to the guide arm 32 is an arm 42, at the end of which the vertically extending follower 16 is secured, which can not be recognised in FIG. 10 however. The guide 12 is arranged adjacent to and parallel to the guide track 36 for the sliding door 30 and oriented in such a manner that the slit-shaped opening of the guide 12 points downwards.

In FIG. 10 it can further be recognised that the ribbon cable 10 extends through the cut-out 18, with a connection plug 42 being provided at the end of the ribbon cable 10 outside the guide 12, being secured outside at the guide 12 and serving for the connection at the vehicle cable tree 44. Furthermore, it can be well recognised in FIG. 10 that the conductor 10 lies in each case in contact guided at three sides at the vertical inner walls inside the guide 12.

The ribbon cable 10 which is led downwardly out of the guide 12 is connected in the region of the follower 16 to a further connection plug 43, by means of which the connection to the door cable tree 46 takes place.

What is claimed is:

1. An electrical connection for electrically connecting an electrical cable in a motor vehicle sliding door to an electrical cable fixed to a vehicle body upon which the sliding door slides, comprising:
   a guide that is fixed to the vehicle body, the guide being of substantially C-shaped cross section with parallel side walls and parallel lateral walls that are fixed with respect to each other, one of the side walls having an exit slot and one of the lateral walls having an elongated slit,
   a ribbon cable that is disposed in the guide and that is deflected therein preferably about 180°,
   the ribbon cable having an end portion that extends through the exit slot, the end portion being fixed with respect to the guide in the vicinity of the exit slot,
   the ribbon cable having an opposite end portion that is attached to a follower,
   the follower and the opposite end portion extending through the elongated slit for attachment to the vehicle door, and
   spring means pressing the ribbon cable against the parallel side walls and one of the lateral walls.

2. The electrical connection as defined in claim 1 wherein the end portion of the ribbon cable has an electrical connector disposed outward of the guide and wherein the opposite end portion of the ribbon cable has an electrical connector disposed outward of the guide.

3. An electrical connection for electrically connecting an electrical cable in a motor vehicle sliding door to an electrical cable fixed to a vehicle body upon which the sliding door slides, comprising:
   a guide that is fixed to the vehicle body, the guide having parallel side walls and a lateral wall that are fixed with respect to each other, the lateral wall having an elongated slit,
   a ribbon cable that is disposed in the guide and that is deflected therein preferably about 180°,
   the ribbon cable having a portion near one end one end that is fixed with respect to the guide and a portion adjacent an opposite end that is attached to a follower,
   the follower extending through the slit in the lateral wall of the guide for attachment to the vehicle door, and
   spring means pressing the ribbon cable against the parallel side walls.

4. The electrical connection as defined in claim 3 wherein the spring means is arranged substantially parallel to the ribbon cable.

5. The electrical connection as defined in claim 3 wherein the spring means is formed by the ribbon cable itself.

6. The electrical connector as defined in claim 5 wherein the spring means is inwardly of the ribbon cable and further including a second ribbon cable that is inwardly of the spring means and arranged substantially parallel to the spring means.

7. The electrical connector as defined in claim 12 wherein the spring means is a spring steel band.

* * * * *